(12) United States Patent
Healy

(10) Patent No.: US 11,712,037 B2
(45) Date of Patent: Aug. 1, 2023

(54) SCRAPE VINES

(71) Applicant: WINDAGE, LLC, Rochester, MN (US)

(72) Inventor: David Robert Healy, Orono, MN (US)

(73) Assignee: WINDAGE, LLC, Rochester, MN (US)

( * ) Notice: Subject to any disclaimer, the term of this patent is extended or adjusted under 35 U.S.C. 154(b) by 39 days.

(21) Appl. No.: 16/939,552

(22) Filed: Jul. 27, 2020

(65) Prior Publication Data

US 2021/0015091 A1  Jan. 21, 2021

Related U.S. Application Data

(63) Continuation of application No. 15/703,250, filed on Sep. 13, 2017, now Pat. No. 10,721,926.

(60) Provisional application No. 62/498,852, filed on Jan. 10, 2017.

(51) Int. Cl.
*A01M 31/00* (2006.01)

(52) U.S. Cl.
CPC .................. *A01M 31/00* (2013.01)

(58) Field of Classification Search
CPC .... A01M 31/00; A01M 31/008; A01M 31/06; A01M 99/00; A01K 29/00; A01K 15/02; A41G 1/00; A41G 1/001; A41G 1/006; A41G 1/007; A41G 1/04; A47G 33/06; A47G 33/08; A47G 33/0854; A47G 33/0863; A47G 33/04; A01G 17/00; A01G 17/04; A01G 5/00; A01G 5/02
USPC ....... 119/712, 174, 839; 248/538; 47/42, 44, 47/55; 43/1, 2
See application file for complete search history.

(56) References Cited

U.S. PATENT DOCUMENTS

| | | | |
|---|---|---|---|
| 2,857,506 A | 10/1958 | Minteer | |
| 3,278,364 A * | 10/1966 | Dieffenbach | A47G 33/06 428/7 |
| 3,331,727 A | 7/1967 | Lieval | |
| 3,458,893 A * | 8/1969 | Dieffenbach | A47G 33/06 425/269 |
| 3,525,659 A * | 8/1970 | Ebihara | A47G 33/06 47/901 |

(Continued)

FOREIGN PATENT DOCUMENTS

JP  H10331016 A  * 12/1998 ............... A41G 1/00

OTHER PUBLICATIONS

Brock, Brent L. Making Artificial Trees and Vines for Naturalistic Vivaria, https://www.dendrobatidae.org/Portals/0/activeforums_Attach/1424223459371.pdf, published Dec. 13, 2005, accessed Dec. 6, 2019.*

(Continued)

*Primary Examiner* — Kathleen I Alker
(74) *Attorney, Agent, or Firm* — McAndrews, Held & Malloy, Ltd.

(57) ABSTRACT

Systems, apparatuses, and methods are described which provide an artificial branch that is coupled to a natural tree. The artificial branch includes one or more adjustable wires that can be used to change the shape of the artificial branch. The artificial branch is structured to receive natural and/or synthetic scent compounds that are sprayed at the artificial branch. In addition, the artificial branch is structured to receive scent compounds from wildlife to facilitate wildlife scent communication.

20 Claims, 1 Drawing Sheet

(56) References Cited

U.S. PATENT DOCUMENTS

| | | | | |
|---|---|---|---|---|
| 4,054,696 A * | 10/1977 | Crownover | ............ | A47G 33/06 |
| | | | | 428/9 |
| 4,364,102 A | 12/1982 | Huppert | | |
| 4,673,599 A | 6/1987 | Vanderslice | | |
| 4,773,177 A | 9/1988 | Gray, II | | |
| 4,859,510 A | 8/1989 | Rademacher | | |
| 4,950,509 A | 8/1990 | DeMott | | |
| 5,104,608 A | 4/1992 | Pickering | | |
| 5,264,258 A | 11/1993 | Cheng | | |
| 3,244,577 A | 4/1996 | Lyle | | |
| 5,555,664 A | 9/1996 | Shockley | | |
| 6,306,471 B1 * | 10/2001 | Pitman | ................. | A01M 31/00 |
| | | | | 135/901 |
| 6,363,649 B1 | 4/2002 | Lambert | | |
| 8,938,905 B1 * | 1/2015 | Moore | ................ | A01M 31/008 |
| | | | | 239/57 |
| 10,791,781 B2 * | 10/2020 | Falk | ....................... | A47G 33/06 |
| 2007/0048464 A1 | 3/2007 | Haupt | | |
| 2009/0246241 A1 * | 10/2009 | Pitt | ........................ | A01N 25/34 |
| | | | | 424/410 |
| 2010/0189752 A1 | 7/2010 | Kassouni | | |
| 2011/0318448 A1 | 12/2011 | Rudd | | |
| 2012/0090557 A1 | 4/2012 | Slade, Jr. | | |
| 2012/0276307 A1 | 11/2012 | Schooley | | |
| 2014/0123538 A1 * | 5/2014 | Matheson | ........... | A01M 31/008 |
| | | | | 43/2 |
| 2018/0282592 A1 * | 10/2018 | Cura | ......................... | C09J 9/00 |
| 2019/0021304 A1 * | 1/2019 | Medlin | ............... | A01M 31/008 |

OTHER PUBLICATIONS

House by Hoff: DIY Flocked Christmas Tree, https://www.housebyhoff.com/2016/12/diy-flocked-christmas-tree/, published Dec. 22, 2016; accessed Dec. 9, 2019.*

Brack, Brent L., Making Artificial Trees and Vines for Naturalistic Vivaria, https://www.dendrobatidae.org/Portals/0/activeforums_Attach/1424223459371.pdf, published Dec. 13, 2005, accessed Dec. 6, 2019.

House by Hoff: DIY Flocked Christmas Tree, http://www.housebyhoff.com/2016/12/diy-flocked-christmas-tree/, published Dec. 22, 2016; accessed Dec. 9, 2019.

* cited by examiner

SCRAPE VINES

RELATED APPLICATIONS

The present application is a continuation of U.S. application Ser. No. 15/703,250, filed Sep. 13, 2017, which claims priority to and benefit from U.S. Application No. 62/498,852, filed Jan. 10, 2017. The above-identified applications are hereby incorporated by reference herein in their entirety.

BACKGROUND

Scents are widely used in the outdoors industry, especially for hunting large game. In an outdoor setting, natural overhanging tree limbs are used as a communication mechanism by wild game such as, for example, white-tailed deer. White-tailed deer leave their scent on the natural overhanging tree limbs for other white-tailed deer to smell.

In the outdoors industry, exemplary scent products include liquids made from natural doe urine and glandular secretions harvested from living deer. Suppliers of these liquid scent products include companies such as Tinks and Hunter Specialties. These liquids are applied to natural overhanging tree limbs to attract white-tailed deer. However, these natural overhanging tree limbs tend to get broken over time by white-tailed deer rubbing their antlers, head, and neck against the natural overhanding tree limbs. When this occurs, these hotspots become dormant, and white-tailed deer choose another location at which to leave their scent. This is unfortunate for the hunter that has staked out a particular location or put resources into building a stationary hideout (e.g., a tree stand, a field blind, etc.).

Further limitations and disadvantages of conventional and traditional approaches will become apparent to one of skill in the art, through comparison of such systems with the present disclosure as set forth in the remainder of the present application with reference to the drawings.

BRIEF SUMMARY

Systems, apparatuses, and methods provide wildlife scent communication substantially as illustrated by and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration.

As utilized herein, the terms "e.g." and "for example" set off lists of one or more non-limiting examples, instances, or illustrations.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

Some embodiments according to the present disclosure relate to systems, apparatuses, and methods for providing wildlife scent communications.

Some embodiments according to the present disclosure provide for scent dispersal on tree branches.

Some embodiments according to the present disclosure provide a synthetic tree branch that has adhesive properties. In some embodiments, the adhesive properties are configured to receive scent compounds (e.g., synthetic and/or natural scent compounds) onto desired surfaces (e.g., surfaces of an overhanging tree limb) to attract wildlife.

Some embodiments according to the present disclosure using synthetic tree limbs to attract wildlife such as deer (e.g., white-tailed deer). Overhanging natural tree limbs of trees in the outdoors, particularly over scrapes, tend to get broken, thereby rendering the scrape site dormant. Some embodiments provide that by hanging synthetic limbs in place of broken natural tree limbs or installing the synthetic limbs over the scrape site, an otherwise dormant scrape site can become active again by providing the mechanism by which to attract deer for hunting seasons to come.

Figure 1:
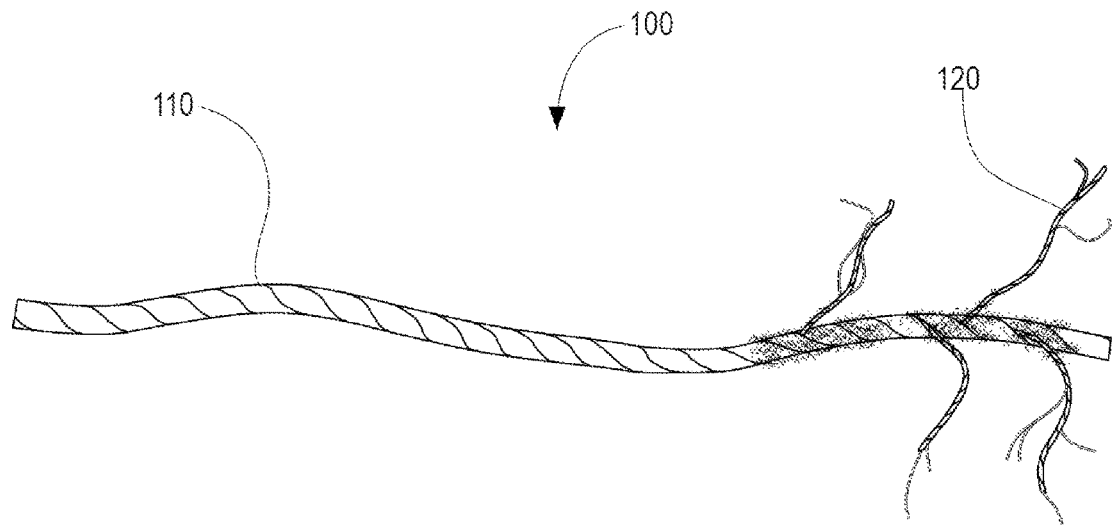
FIG. 1 shows an embodiment of an artificial branch according to an embodiment of the present disclosure.

FIG. 1 shows an embodiment of an artificial branch 100 of a tree or a bush according to the present disclosure. Referring to FIG. 1, the artificial branch 100 includes a main limb 110. Protruding from end portions of the main limb 110 are vines 120. In some embodiments, some or all of the vines 120 are replaced with twigs or secondary branches. For simplicity of discussion, vines 120 will encompass vines, twigs, and/or secondary branches. In the illustrated embodiment, the vines 120 are formed in the approximately 2.5-foot end portion of the approximately 5-foot artificial branch 100. In some embodiments, the approximately 2.5-foot end portion is the lower portion of the branch.

Figure 2:
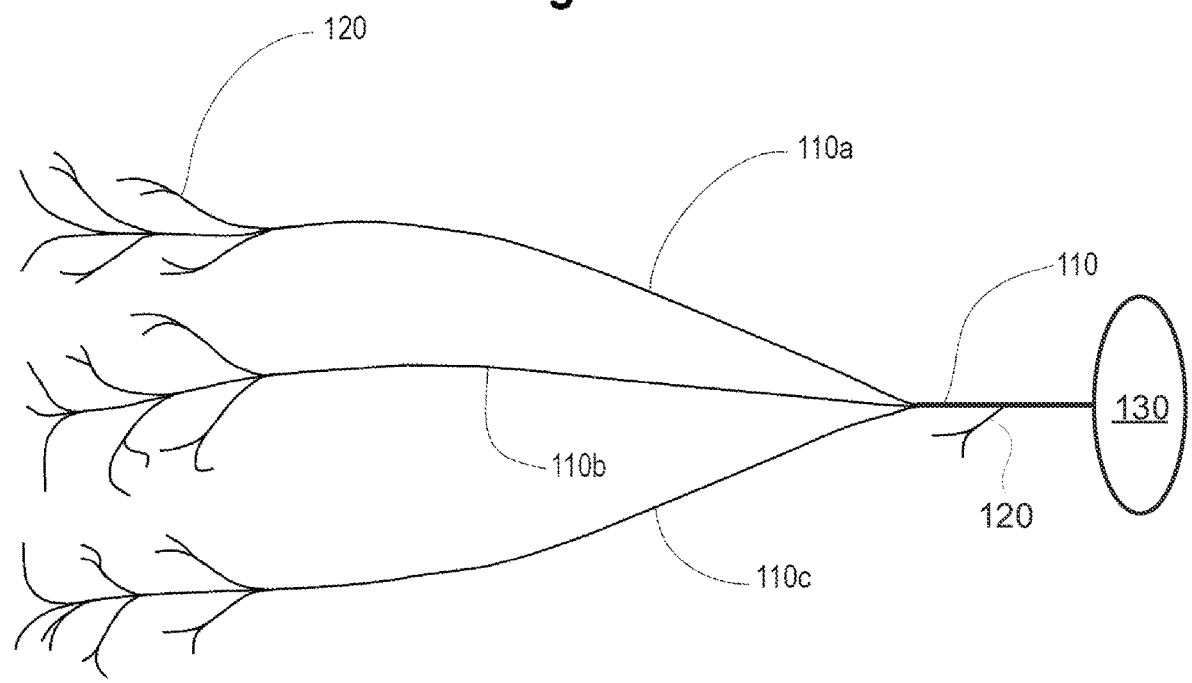
FIG. 2 shows an embodiment of an artificial branch according to an embodiment of the present disclosure.

Referring to FIG. 2, the main limb 110 is shown as diverging into three limbs 110a-c. As illustrated, the vines 120 are formed in the approximately 2.5-foot end portions of the limbs 110a-c of the approximately 5-foot artificial branch 100.

Some embodiments provide that one or more adjustable wires run through the main limb 110, the limbs 110a-c, and/or the vines 120. The wires are flexible such that the shape of the vines 120 can adjusted and then hold its new shape. Thus, for example, the artificial branch 110 can be folded, rolled, or shaped for shipping, and then shaped again into a natural-looking branch in the field. Further, the wire core provides the artificial branch 100 with the structural integrity to withstand the physical strain applied by deer antlers.

Some embodiments provide that the vines 120 can be formed by wrapping the vines 120, which include one or more wires in its core, around the main limb 110 or other limbs 110a-c in the approximately 2.5-foot end portion of the approximately 5-foot artificial branch 100. Vines 120 can also be wrapped around other vines 120 to form secondary vines or twigs. In some embodiments, a non-toxic glue is applied to fix the wrapped vines 120 to the main limb 110, other limbs 110a-c, and/or other vines 120.

Some embodiments provide that the artificial branch 100 includes one or more of the following: a metal material, a synthetic poly-viscose (PV) cotton material, a paper material, a non-toxic glue, a non-toxic paint, and a rattan material that surround the one or more wires. Other materials might include a poly cotton material and a polyester cotton material. Some embodiments provide that the artificial branch 100 is waterproof. In some embodiments, by using one or more of a wire, a PV cotton material, a paper material, and/or a rattan material, for example, the artificial branch 100 can be made waterproof and last for years.

Some embodiments provide that the artificial branch 100, the main limb 110, the limbs 110a-c, and/or the vines 120 have a composition of at least the following: approximately 15% metal; 35% paper; and 35% non-toxic glue.

Some embodiments provide cotton fibers to simulate moss protruding from the main limb 110, the limbs 110a-c, and/or the vines 120.

In operation according to some embodiments, the artificial branch 100 can be attached to an existing tree or bush (e.g., a trunk, a limb, a branch, a vine, etc.) or an artificial stand (e.g., a pole, structure, etc.). In some embodiments, the artificial branch 100 has one of its ends attached to a trunk or branch of a tree via a nail, a screw, a wire, a clip, glue, a fastener (e.g., fabric hook-and-loop fasteners, a velcro fastener, etc.), or other attachment mechanisms 130. The artificial branch 100 can be a replacement for an existing natural branch that has broken or has been removed. In some embodiments, the artificial branch 100 can be hung vertically via a wire, a string, a rope, a fastener, a hanger, or other attachment mechanisms 130 that are attached to the tree (e.g., a branch of the tree). In some embodiments, the artificial branch 100 is configured with a loop, a hole, an connecting extension, etc. that can be looped or attached to the tree (e.g., slide an existing branch through the loop or hole to hold the artificial branch 100 up) or some attachment mechanism 130 that is attached to the tree, for example. In some embodiments, the artificial branch 100 is positioned at a height designed to facilitate and encourage scent communication among deer, for example. In some embodiments, the artificial branch 100 is placed above a deer scrape or in a rub line or a scrape line.

Some embodiments provide that a scent compound be applied to the artificial branch 100. Natural and/or synthetic materials can be used to represent overhanging tree limbs as a way to repeatedly attract deer. In some embodiments, a powdered synthetic scent compound or other type of scent compound can be dispensed via a spray bottle. An exemplary spray bottle design is shown in U.S. Design Application No. 29/255,577, which is hereby incorporated by reference herein in its entirety, whereby the sprayed powdered scent compound can become airborne and applied directly to the artificial branch 100, the tree, the soil, and/or surrounding vegetation.

Some embodiments provide that the scent compound is a powder or a liquid. Some embodiments provide that the scent compound is based on synthetic and natural compounds. Some embodiments provide that the scent compound is based on a natural deer urine compound. Some embodiments provide that the scent compound is based on secretions from one or more glands of a deer such as, for example, forehead glands, nasal glands, pre-orbital glands, vomeronasal glands, preputial glands, tarsal glands, interdigital glands, and/or meta tarsal glands.

Some embodiments provide that scent compounds applied to the artificial branch 100 are not limited to synthetic (and/or natural) scent compounds that are applied to the artificial branch 100 by the hunter, for example. Some embodiments provide that scent compounds can also come directly from the deer as the deer interacts with the artificial branch 100. For example, the deer can rub its forehead against the artificial branch 100, or can bite or lick the artificial branch 100, thereby leaving its scent behind on the artificial branch 100.

Some embodiments provide that the scent compound comprise a formulation that includes synthetic and natural compounds that include a porous carrier or a binder powder, an adhesive, and a scent. The porous carrier or the binder powder can include talc powder or talcum powder, for example. In some embodiments, the adhesive operates to adhere the scent compound to the artificial branch 100, for example. In some embodiments, the scent compound adheres to the artificial branch 100, in part, due to adhesive properties of the surface of the artificial branch 100.

Some embodiments provide a synthetic and natural artificial tree branch with an adjustable metal wire that is attached to and/or hung from a natural tree. The artificial tree branch can be made of a PV cotton material, a paper material, and a rattan material. The artificial tree branch and/or the scent compound applied to the tree limb can include a porous carrier or compound and an adhesive compound. The scent compound, which can be include natural and/or synthetic compounds, is shelf-stable and convenient to apply, carry, and store. The artificial branch and/or scent compound can be configured so that the scent compound adheres to the surface of the artificial branch, thereby ensuring that some of the scent compound remains where it is applied, even in locations where the potential exists for some of the scent compound to drip or be blown away.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

The invention claimed is:

1. An artificial tree branch, comprising:
a main limb comprising a wire core, a wire cover that encases an outer surface of the wire core, and a wildlife scent compound adhered to an outer surface of the wire cover; and
a plurality of vines, wherein each vine comprises a wire core of one or more wires wrapped around the main limb; and
wherein the wire core of the main limb and the wire core of each vine are configured to change a shape of the artificial tree branch, and hold the changed shape of the artificial tree branch in response to adjustments; and
wherein the wire cover of the main limb includes:
a synthetic poly-viscose cotton material, a synthetic polyester cotton material, or a synthetic poly cotton material;
a non-toxic glue and a non-toxic paint; and
a rattan material that covers the outer surface of the wire core of the main limb.

2. The artificial tree branch according to claim 1, wherein an end of the main limb comprises an attachment mechanism.

3. The artificial tree branch according to claim 1, wherein the wire core of the main limb includes a metal material.

4. The artificial tree branch according to claim 1, comprising simulated moss on one or more of the plurality of vines.

5. The artificial tree branch according to claim 1, wherein the wildlife scent compound comprises a synthetic deer scent compound.

6. The artificial tree branch according to claim 1, wherein the wildlife scent compound comprises a natural deer scent compound.

7. An artificial tree branch, comprising:
a main limb;
a loop at a first end of the main limb, wherein the loop is sized to receive and couple a branch of a tree to the main limb;
a plurality of secondary limbs diverging from the main limb;
a first plurality of vines; and
non-toxic glue that affixes the first plurality of vines to the plurality of secondary limbs:
wherein the main limb, the plurality of secondary limbs, and the first plurality of first vines each comprise a wire core, a wire cover that encases an outer surface of the wire core, and a wildlife scent compound adhered to the wire cover;
wherein the wire core of each vine of the first plurality of vines comprises one or more wires wrapped around a secondary limb of the plurality of secondary limbs; and
wherein each wire cover of the main limb, the plurality of secondary limbs, and the first plurality of vines includes:
a paper material; and
a synthetic poly-viscose cotton material, a synthetic polyester cotton material, or a synthetic poly cotton material.

8. The artificial tree branch according to claim 7, wherein each wire core of the main limb, the plurality of secondary limbs, and the first plurality of vines permits changing a shape of the artificial tree branch, and holds the changed shape of the artificial tree branch.

9. The artificial tree branch according to claim 7, comprising a second plurality of vines wrapped around the main limb.

10. The artificial tree branch according to claim 7, wherein each wire cover of the main limb, the plurality of secondary limbs, and the first plurality of vines comprises a rattan material that covers and encases its respective wire core.

11. The artificial tree branch according to claim 7, wherein each wire cover of the main limb, the plurality of secondary limbs, and the first plurality of vines has adhesive properties configured to retain the wildlife scent compound on surfaces of the main limb, the plurality of secondary limbs, and the first plurality of vines.

12. The artificial tree branch according to claim 7, wherein the wildlife scent compound comprises a synthetic deer scent compound.

13. The artificial tree branch according to claim 7, wherein the wildlife scent compound comprises a natural deer scent compound.

14. An artificial tree branch, comprising:
a main limb;
a loop at a first end of the main limb, wherein the loop is sized to receive and couple a branch of a tree to the main limb;
a plurality of secondary limbs diverging from the main limb; and
a first plurality of vines,
wherein the main limb, the plurality of secondary limbs, and the first plurality of vines each comprise a wire core, a wire cover that encases an outer surface of the wire core, and a wildlife scent compound adhered to the wire cover;
wherein the wire core of each vine of the first plurality of vines comprises one or more wires wrapped around a secondary limb of the plurality of secondary limbs; and
wherein each wire cover of the main limb, the plurality of secondary limbs, and the first plurality of vines comprises:
a synthetic poly-viscose cotton material, a synthetic polyester cotton material, or a synthetic poly cotton material;
a rattan material that covers and encases its respective wire core; and
adhesive properties configured to retain the wildlife scent compound.

15. The artificial tree branch according to claim 14, wherein each wire core of the main limb, the plurality of secondary limbs, and the first plurality of vines permits changing a shape of the artificial tree branch, and holds the changed shape of the artificial tree branch.

16. The artificial tree branch according to claim 14, wherein each wire cover of the main limb, the plurality of secondary limbs, and the first plurality of vines includes a paper material.

17. The artificial tree branch according to claim 14, comprising non-toxic glue that affixes the first plurality of vines to the plurality of secondary limbs.

18. The artificial tree branch according to claim 14, comprising a second plurality of vines wrapped around the main limb.

19. The artificial tree branch according to claim 14, wherein the wildlife scent compound comprises a synthetic deer scent compound.

20. The artificial tree branch according to claim 14, wherein the wildlife scent compound comprises a natural deer scent compound.

* * * * *